Patented Aug. 13, 1929.

1,724,778

UNITED STATES PATENT OFFICE.

JOHN D. RUE, OF MADISON, WISCONSIN; SIDNEY D. WELLS, OF QUINCY, ILLINOIS; AND FRANCIS G. RAWLING, OF MADISON, WISCONSIN.

FIBROUS MATERIAL FOR ODORLESS CONTAINERS.

No Drawing. Application filed September 13, 1926. Serial No. 135,291.

This invention relates to containers for packaging foodstuffs and to processes for preparing the material of the container.

The improvement is of particular importance in making, as a new product, an odorless strawboard suitable for egg crate fillers, and one which will remain odorless under cold storage conditions. Combined with the feature of odorlessness, the product resultant of the procedure defined herein contains an unusually large content of both cellulose, lignin and pentosan, as compared to most strawboard materials.

In the production of fillers for cases for the shipment and storage of eggs, strawboard made from straw pulped by digestion with hydrates of alkaline earths is almost exclusively used. Under storage conditions where the humidity of the air is in the neighborhood of from 80 to 90%, the strawboard fillers develop an odor suggestive of musty straw, to which has been blamed some of the so-called cold storage taste in eggs. Studies of strawboard fillers have shown that even under the most careful conditions of manufacture, approximately half the lime used in cooking is present in the board. As the board becomes damp in cold storage, the lime residues react and the characteristic odor is produced. The present invention is offered as an improvement by which the undesirable odors are avoided.

It has been discovered that straw pulped by digestion with solutions containing sodium carbonate and sodium sulphite in amounts totaling 7½% of the weight of the straw, can be manufactured into boards that do not develop objectionable odors under storage conditions. The general steps of the process are approximately the same as when lime is used and the difference is that the products of digestion are either water soluble residues from the combination of the cooking agent with the incrusting matter in the straw or the fibrous pulp which may be readily washed of all cooking residues on account of their ready solubility in water.

Egg case fillers produced from board made as specified above have been found to keep the eggs with an average of 77% of the eggs free from objectionable flavors while the standard type of filler under identical conditions yielded only 57% of the eggs free from objectionable flavors. Objectionable flavors of course are caused by several factors, but the difference in the two results indicates that the fillers made from lime cooked straw are partly responsible. Perfect eggs stored in the improved fillers under good storage conditions have come out of storage without any objectionable flavors.

In the production of paper pulp for straw board from cereal straws, flax, straw, corn stalks, bagasse, rushes, saw grass and other fibrous vegetable materials by means of digestion or boiling in aqueous solutions at elevated temperatures sodium carbonate has been frequently suggested as a softening or pulping agent. It has been found by experience, however, that when used without the addition of caustic lime or alkali the softening action of sodium carbonate alone is insufficient for practical purposes. It has been found that when sodium sulphite is used in conjunction with sodium carbonate, the softening action is greater than with the use of either alone or with sodium carbonate equal to the sum of the two, and a product is obtained which can readily be beaten, rubbed or pounded to a condition suitable for paper making, and capable of receiving or dispensing with further chemical treatment. Sodium sulphite has been suggested before as a cooking agent, but in all cases it is supposed to play the leading part and is used in relatively large quantities or in conjunction with caustic alkali. One of the troubles experienced in the use of caustic soda is that this chemical is so active that difficulty has been experienced in distributing small amounts through the vegetable material to be cooked without excessive local action. It has also been suggested that sodium sulphite might be used with sodium bicarbonate, but with results that show that the bicarbonate increases the normal and undesirable tendency toward the acidity of the batch due partially at least to the liberation of un-neutralized organic acids, which acidity tends to produce an undesired brittleness of the partially cooked product.

One of the important points is the use of sodium carbonate and with relatively large amounts of this material. For instance excellent results have been obtained by using five parts of carbonate to one of sulphite as with the use of 1.5 parts of sodium sulphite and 7.5 parts of sodium carbonate in the digestion of 100 parts of wheat straw. In the digestion of flax straw eight parts of sodium sulphite and twelve parts of sodium carbonate per 100 parts of straw were satisfactory. Variation in the ratio of sodium sulphite and sodium carbonate can be used. The amount of either the carbonate or the sulphite, considered alone, is insufficient to complete the necessary softening. Sufficient sodium carbonate is desirable, however, to neutralize the organic acids formed by the hydrolytic action of the sodium sulphite. The neutralization of the acids by the sodium carbonate are indicated by the formation of carbon dioxide during the cooking which may be gradually removed by gassing. The sulphite is thus released for further hydrolysis and small amounts will consequently suffice. The mixture is particularly effective in softening the knots in cereal straws and the like while the stems in between may be softened to a milder degree than is possible with present methods and yet yield a satisfactory product.

The following comparative tables show what proportions of cellulose, lignin and pentosan may be obtained by the process of the present invention as compared to other known processes.

|  | Cellulose | Lignin | Pentosan |
|---|---|---|---|
| Wheat straw | 56 | 28 | 27 |
| Straw board made from lime cooked straw | 60 | 22 | 24 |
| Straw board made from sodium sulphite and carbonate cooked straw | 72 | 25 | 29 |
| Bleached straw pulp from caustic soda cooked straw | 96 | 2 | 32 |
| Flax straw | 50 | 24 | 24 |
| Pulp made from sodium sulphite and carbonate cooked flax straw | 71 | 21 | 22 |

In regard to the amounts of cellulose, pentosan and lignin, the total amount of which may be more than 100%, it may be noted that the chemical structure of all of these substances is not definitely known, and the methods of analysis available are only proximate. When cellulose is determined and the residue, which is thought to be cellulose, is tested for pentosan the amounts to be found may vary from 3 to 15%. Likewise, some of the pentosan shows up in the lignin test as lignin. Accordingly, in the foregoing statement of the methods of analysis which may be used, the total amount of either of these three materials may add up to as much as from 110% to 125%. This is because the figures are the values given by particular methods of analysis, hereinafter specified. A typical analysis of straw board made from sodium sulphite and sodium carbonate cooked straw is given in the foregoing table. The test for cellulose was 72%; the test for lignin 25%; and the test for pentosan 29%. In conducting the tests different portions of the sample are used for each test. Certain constituents yield a residue, which is reported as cellulose, and also is reported as furfural phloroglucide which tends to indicate that they are of pentosan structure. Furthermore, certain other constituents yield both the residue with sulphuric acid reported as lignin and also furfural phloroglucide, thus showing pentosan structure.

The pulps made by cooking with these methods differ from the usual product in that they are over 65% and under 80% cellulose while the lignin is over 20% and the pentosan over 20%. Not only do the pulps obtained differ in the amount of cellulose of which they are constituted but they are free from the objectionable musty odor characteristic of lime cooked straw board when it is moistened or has absorbed moisture from damp air such as is present in cold storage plants. This property renders the former pulps suitable for egg case fillers in the storage of eggs and other food products susceptible to the acquisition of taste from the odor of surrounding objects.

In the operation of the process, the following steps are included. The fibrous vegetable material is charged into a boiler or digestor, after cutting, shredding, or crushing into suitable form, if such mechanical treatment is necessary. If a temperature of 212° F. is to be used, open vessels may be utilized. In the case of cereal straw or flax straw, cutting or shredding is not necessary, although certain advantages may be gained by such treatment. The charge of aqueous cooking solution of sodium carbonate and sodium sulphite amounting to 7½% of the weight of the straw is then added, and the contents heated by means of the application of either direct or indirect steam. After steaming sufficiently, the digestor is relieved of pressure by opening a valve, whereupon the hot air, carbon dioxide and steam are allowed to escape. More straw may be added and the operation repeated. When the full charge of straw has been added in successive batches, the final heating is performed. Air, carbon dioxide and other gases are allowed to escape from time to time, until the excess pressure over the steam pressure for the temperature indicated is as low as is practical. When a temperature of 260° F. is attained, the cooking is usually completed at the end of about eight hours. The steam in the vessel is then relieved and the contents emptied and beaten, pounded, or rubbed either before or after washing to effect the completion of the product into fibers.

The material obtained by the chemical treatment may be distinguished by its chemical analysis, using the following methods.

*Cellulose.*—The cellulose is determined by subjecting the material to alternate treatments with chlorine gas in the presence of water and washing with sodium sulphite solutions under the conditions suggested by Cross and Bevan and described by A. W. Schorger Jour. Ind. and Eng. Chem. 9, (1917) 556. In accordance with this, the following procedure is used. Two grams of air dry pulp in an alundum crucible are extracted three to four hours with a mixture of 67 per cent of benzol and 33 per cent alcohol. After evaporation of the solvent the shavings are thoroughly washed with hot water using the suction pump. The moist pulp is then transferred with a pointed glass rod to a 250 cc. beaker, evenly distributed over the bottom, and subjected to a stream (about forty bubbles per minute for each sample) of water washed chlorine gas for half an hour. The end of the tube delivering the chlorine gas should be about one-half inch above the pulp. At intervals of six to seven minutes the contents of the beaker are stirred to insure uniformity of chlorination. After the chlorine treatment the pulp is treated with a solution of $SO_2$ until the chlorine odor disappears, transferred to the alundum crucible, and washed with hot water. The pulp is again returned with the glass rod to the beaker, and 100 cc. of a two per cent sodium sulphite solution are added and the beaker, covered with a watch glass, placed in a boiling water bath for 30 minutes. The fibers are then transferred to the crucible and washed with water. The above procedure is seldom sufficient to remove all the lignin, so that the treatment with chlorine and subsequent treatment as outlined above is repeated until the fibers are practically a uniform white. The second and following treatments with chlorine should not be longer than 15 to 30 minutes. After all the lignin has been removed the fibers are given a final bleaching by adding 20 cc. of a 0.1 per cent solution of potassium permanganate, allowed to stand 10 minutes and rendered colorless with $SO_2$ solution. The fibers are then thoroughly washed with hot water, dilute acetic acid, then with hot water, then with alcohol and finally with ether, and dried for two hours at 105° C. in the air oven. After cooling by a dessicator over $H_2SO_4$, the crucible is weighed in a weighing bottle.

*Pentosan.*—The following method is used for determining pentosans and methyl pentosans. Two grams of air dry pulp are placed in a 250 cc. flask provided with a separatory funnel and attached to a condenser (Fig. II). One hundred cc. of 12 per cent hydrochloric acid (sp. gr. 1.06) is added and the contents of the flask are distilled at the rate of 30 cc. in 10 minutes. The distillate is passed through a small filter before entering the receiver. As soon as 30 cc. of distillate are collected 30 cc. of HCl are added to the distillation flask and the distillation is continued in this manner until 360 cc. of distillate are collected. To the total distillate, add 40 cc. of filtered phloroglucide solution that has been prepared at least a week previously by heating 11 grams of phloroglucine in a beaker with 300 cc. of 12 per cent HCl, and after solution has taken place making up to 1500 cc. with 12 per cent HCl. After addition of the phloroglucine, the solution soon turns greenish black. After standing 16 hours the furfural phloroglucide will have settled to the bottom of the beaker. If a drop of the supernatant liquid gives a pink color with aniline acetate paper the precipitation of the furfural is incomplete. A further amount of phloroglucine solution is then added and the beaker allowed to stand overnight as formerly. In no case so far has it been necessary to use more than 40 cc. phloroglucine solution.

The furfural phlorglucide is filtered, using a tared Gooch crucible having a thick asbestos mat and washed with exactly 150 cc. of water. The crucible is then dried for 4 hours in a water oven and weighed in a weighing bottle.

The crucible is placed in a narrow beaker and 20 cc. of 95 per cent alcohol is added to the crucible. The beaker is then placed in a water bath maintained at 60° C. for 10 minutes. The alcohol is removed with a suction pump and the process repeated (usually four or five times) until the alcohol that runs through is practically colorless. The crucible is then dried for 2 hours in the water oven and again weighed. The weight of the residue phloroglucide subtracted from the weight of mixed phloroglucide gives the weight of methyl furfural phloroglucide. From the weights of furfural phloroglucide and methyl furfural phloroglucide obtained the amounts of pentosan and methyl pentosan present in the wood are calculated from the table of Krober and Tollens (Aberhalden's "Hand buch der biochemischen Arbeitsmethoden", Vol II, pages 137 and 154). The table for the calculation of pentosans has a range for weights of phloroglucide between 0.030 and 0.300 grams. For weights of phloroglucide outside of these limits Krober gives the following formula:

For weight of phloroglucide "a" under 0.030 gm.

$$\text{Pentosans} = (a - 0.0052) \times 0.8949 \text{ gm.}$$

For weight of phloroglucide "a" over 0.300 gm.

$$\text{Pentosans} = (a + 0.0052) \times 0.8824.$$

For the calculation of methyl pentosan the following formula may be used instead of the table:—

$$\text{Methyl pentosan} = (1.85 \text{ Ph} - 625 \text{ Ph}^2 + 0.0040)$$

Ph. is the weight in grams of methyl furfural phloroglucide.

*Lignin.*—The lignin or non-cellulose content of pulp is determined by a modification of the method of Ost and Wilkening, employed in the hydrolysis of cellulose. Two to four grams of air dry pulp are weighed in an alundum thimble, extracted with ether in a soxhlet apparatus for 3 to 4 hours, and dried at 105° C. The pulp is then removed from the alundum extraction thimbles, placed in 250 cc. beakers, divided into fine particles and treated with 40 cc. of 72.0 per cent sulphuric acid. The hydrolysis is allowed to proceed for 16 hours at room temperature, with frequent stirring at the beginning of the operation. The resulting solution is transferred to a two liter Erlenmeyer flask diluted to 1570 cc. with distilled water, which makes the concentration of $H_2SO_4$ exactly 3 per cent, and boiled under a reflux condenser for two hours. This causes a coagulation of the suspended particles of lignin, which is then filtered on an alundum crucible, washed thoroughly with hot water, dried and weighed as lignin.

After the pulps have been beaten, rubbed, or pounded to their ultimate fibers they may be further purified by chlorination, washing with the spent lyes from the digestion or dilute solutions of caustic soda, sodium carbonate, or sodium sulphite or mixtures thereof, bleaching, acidulation or combinations of these steps and a white pulp suitable for white papers can be obtained. For many purposes, however, further treatment is unnecessary and the unbleached material may be manufactured into paper products with the customary machinery known to the art.

Thus far the description relates generally to a process for the treatment of pulp materials for improved grades of paper pulp which process is described and claimed in our copending application, Serial No. 133,516 filed September 3, 1926. The fact will be appreciated that in making strawboard the refining steps, such as bleaching and the like may be discarded to a very considerable degree. It is of considerable importance, however, that washing be conducted to remove the full amount of the water soluble matter released during the digestion whether this washing be carried to completion before or after the mechanical treatment.

In the foregoing description only the use of sodium as a base is mentioned. It is of course obvious that any soluble alkaline carbonate, bicarbonate, sulphite or bisulphite which can be so combined either in the digestor or before introduction therein to produce the same or similar conditions may be used.

It will be understood that the pulp which has thus been prepared for use in making strawboard is to be formed into convenient shape for further use by molding or pressing, or by the use of any of the ordinary and common paper making machinery. Such subsequent shaping of the strawboard pulp is not a part of the present invention. The resultant strawboard pulp may be formed into any of the usual articles but it is an important contribution as the material of food stuff containers, such as egg cases and egg case fillers, partitions and spacers where the absence of odor-forming materials enables the pulp product to render effective service.

This invention is based on the disclosure of the product in the application of Wells, Serial No. 38,354, filed June 19, 1925 and which originally contained claims to the product and from which application this present application has been in part copied.

This application is a continuation in part of our application Serial No. 100,685, filed April 8, 1926, treatment of wood for production of pulp.

We claim:—

1. A material for use in containers for food stuffs comprising a vegetable fibrous material free from objectionable odor under cold storage conditions and made from cereal straw by mildly cooking the same until softened but not pulped into their ultimate fibers with a chemical agent which consists solely of an aqueous solution of sodium carbonate and sodium sulphite.

2. A material for use in containers for food stuffs comprising a vegetable fibrous material free from objectionable odor under cold storage conditions and made from cereal straw by mildly cooking the same until softened but not pulped into their ultimate fibers with a chemical agent which consists solely of an aqueous solution of sodium carbonate and sodium sulphite in amounts totaling approximately 7½% of the straw, by weight.

3. A material to be used for containers for food stuffs comprising a vegetable fibrous material free from objectionable odor under cold storage conditions and formed from pulp testing over sixty-five per cent of cellulose, over twenty per cent of pentosan and twenty per cent lignin and made from cereal straw by mildly cooking the vegetable fibrous material until softened but not pulped into their ultimate fibers with a chemical agent which consists solely of an alkaline sulphite and an alkaline carbonate.

4. In the manufacture of vegetable fibrous containers for food stuffs the process of preparing the pulp for the container which process comprises mildly digesting straw with a material consisting solely of an aqueous solution of sodium carbonate and sodium sulphite until softened but not pulped into their ultimate fibers, washing the pulp substantially free of chemical and its dissolved incrusted matter from straw, and utilizing the straw pulp in the manufacture of strawboard.

5. A material for use in containers for food stuffs comprising a vegetable fibrous material free from objectionable odor under cold storage conditions and made from cereal straw by mildly cooking the same with a chemical agent which consists solely of an aqueous solution of sodium carbonate and sodium sulphite, and which cereal straw, subsequent to the cooking, has been treated to a mechanical separation to separate previously softened fibrous particles.

6. A material for use in containers for food stuffs comprising a vegetable fibrous material free from objectionable odor under cold storage conditions and made from cereal straw by mildly cooking the same with a chemical agent which consists solely of an aqueous solution of sodium carbonate and sodium sulphite in amounts totaling approximately 7½% of the straw, by weight, and which cereal straw, subsequent to the cooking, has been treated to a mechanical separation to separate previously softened fibrous particles.

7. A material for use in containers for food stuffs comprising a vegetable fibrous material free from objectionable odor under cold storage conditions and formed from pulp testing over sixty-five per cent of cellulose, over twenty per cent of pentosan and twenty per cent lignin and made from cereal straw by mildly cooking the vegetable fibrous material with a chemical agent which consists solely of an alkaline sulphite and an alkaline carbonate, and which cereal straw, subsequent to the cooking, has been treated to a mechanical separation to separate previously softened fibrous particles.

8. In the manufacture of vegetable fibrous containers for food stuffs, the process of preparing the pulp for the container which process comprises mildly digesting straw until softened but not pulped into their ultimate fibers with a material consisting of an aqueous solution of sodium carbonate and sodium sulphite, washing the pulp substantially free of chemical and its dissolved incrusted matter from straw, subjecting the washed pulp to a mechanical treatment to separate the fibrous particles which have been previously softened in said digesting treatment, and utilizing the straw pulp thus resultant of the mechanical treatment in the manufacture of strawboard.

In testimony whereof we affix our signatures.

JOHN D. RUE.
SIDNEY D. WELLS.
FRANCIS G. RAWLING.